United States Patent
Beir et al.

(10) Patent No.: US 7,127,501 B1
(45) Date of Patent: Oct. 24, 2006

(54) METHOD AND SYSTEM FOR PROVIDING A NETWORKED COLLABORATIVE WORK ENVIRONMENT

(75) Inventors: Jeffrey Beir, Winchester, MA (US); Melissa Leffler, Concord, MA (US); Glenn McDonald, Cambridge, MA (US); Andy Dennie, Framingham, MA (US); Paul Kleppner, Cambridge, MA (US); Neal Finnegan, Arlington, MA (US); Craig Morrissey, Wellesley, MA (US); Alan Steele, Boston, MA (US); Patrick Crowley, Arlington, MA (US); Pito Salas, Arlington, MA (US)

(73) Assignee: eRoom Technology, Inc., Cambridge, MA (US)

( * ) Notice: Subject to any disclaimer, the term of this patent is extended or adjusted under 35 U.S.C. 154(b) by 647 days.

(21) Appl. No.: 09/703,276

(22) Filed: Oct. 31, 2000

Related U.S. Application Data (63) Continuation of application No. 08/893,111, filed on Jul. 15, 1997, now Pat. No. 6,233,600.

(51) Int. Cl.
*G06F 15/16* (2006.01)

(52) U.S. Cl. ........................ 709/219; 709/201; 709/205; 709/217; 709/248

(58) Field of Classification Search ................ 709/201, 709/205, 217, 219, 248
See application file for complete search history.

(56) References Cited

U.S. PATENT DOCUMENTS

| | | | |
|---|---|---|---|
| 5,220,657 A | 6/1993 | Bly et al. ................... 395/425 |
| 5,233,687 A | 8/1993 | Henderson, Jr. et al. .... 395/158 |
| 5,379,374 A | 1/1995 | Ishizaki et al. ............. 395/155 |
| 5,390,297 A | 2/1995 | Barber et al. ............... 395/200 |
| 5,392,400 A | 2/1995 | Berkowitz et al. .......... 395/200 |
| 5,457,797 A | 10/1995 | Butterworth et al. ....... 395/650 |
| 5,533,183 A | 7/1996 | Henderson, Jr. et al. .... 395/158 |
| 5,671,412 A | 9/1997 | Christiano .................. 395/615 |
| 5,678,042 A | 10/1997 | Pisello et al. ............... 395/610 |
| 5,687,317 A | 11/1997 | Hughes et al. ......... 395/200.03 |
| 5,724,508 A | 3/1998 | Harple, Jr. et al. ......... 395/200 |
| 5,781,727 A | 7/1998 | Carleton et al. ............ 395/200 |
| 5,793,365 A | 8/1998 | Tang et al. .................. 345/329 |
| 5,801,700 A | 9/1998 | Ferguson ..................... 345/349 |
| 5,805,803 A | * 9/1998 | Birrell et al. ............... 713/201 |
| 5,826,025 A | 10/1998 | Gramlich ............... 395/200.47 |
| 5,829,001 A | 10/1998 | Li et al. ....................... 707/10 |
| 5,861,883 A | * 1/1999 | Cuomo et al. ............. 345/733 |
| 5,862,330 A | 1/1999 | Anupam et al. ....... 395/200.34 |
| 5,862,346 A | 1/1999 | Kley et al. .................. 395/200 |
| 5,875,296 A | * 2/1999 | Shi et al. .................... 713/202 |
| 5,918,009 A | * 6/1999 | Gehani et al. .............. 713/201 |
| 5,918,010 A | 6/1999 | Appleman et al. ..... 395/200.33 |
| 5,918,228 A | * 6/1999 | Rich et al. .................... 707/10 |
| 5,923,845 A | 7/1999 | Kamiya et al. ........ 395/200.36 |
| 5,923,846 A | * 7/1999 | Gage et al. ............... 379/93.12 |
| 6,003,084 A | * 12/1999 | Green et al. ................ 709/227 |
| 6,026,433 A | 2/2000 | D'Arlach et al. ........... 709/217 |
| 6,061,695 A | 5/2000 | Slivka et al. ............... 707/513 |
| 6,191,786 B1 | * 2/2001 | Eyzaguirre et al. ......... 345/356 |
| 6,191,807 B1 | * 2/2001 | Hamada et al. ........... 348/14.07 |
| 6,351,766 B1 | * 2/2002 | Vidovic ...................... 709/219 |
| 6,430,625 B1 | * 8/2002 | Kley et al. .................. 709/246 |

* cited by examiner

*Primary Examiner*—Saleh Najjar
(74) *Attorney, Agent, or Firm*—Cooley Godward LLP (57) ABSTRACT

A system and method for providing a collaborative work environment includes servers and client workstations. Client workstations receive data objects from one or more servers and combine the received data objects with stored templates to render HTML pages representing at least a portion of a common project. Users may view, edit, and create common documents for the projects and upload them to the server using a drag-and-drop interface. Additionally, since all file transfers take place using HTTP, project groups can span corporate organizations as well as time zones and geographic boundaries.

27 Claims, 5 Drawing Sheets

METHOD AND SYSTEM FOR PROVIDING A NETWORKED COLLABORATIVE WORK ENVIRONMENT

RELATED APPLICATION

This application is a continuation of U.S patent application Ser. No. 08/893,111, filed Jul. 15, 1997 now U.S. Pat. No. 6,233,600.

FIELD OF THE INVENTION

The present invention relates to networked systems and, more particularly, to systems and methods for providing a collaborative work environment over a network.

BACKGROUND OF THE INVENTION

The world wide network of computers commonly known as the "Internet" has grown rapidly over the last several years. Much of this growth has been driven by the increase in popularity of the World Wide Web ("WWW" or "Web"). The WWW is a collection of files written using HyperText Markup Language (HTML), commonly referred to as "Web pages." HTML files may be easily configured and created by users and accessed and displayed using specialized applications known as Web browsers, which allow a user to access and view HTML files using a graphical user interface.

Servers hosting HTML files can communicate using the HyperText Transfer Protocol ("HTTP"). HTTP is a communication protocol that provides user access to files (which can be in different formats such as text, graphics, images, sound, video, etc.) written using the HTML page description language. HTML provides basic document formatting functions and allows the developer of the HTML page to specify communication links to other servers and files. Use of an HTML-compliant browser on a client workstation involves specification of a link via a Uniform Resource Locator address or "URL". Upon such specification, the browser makes a "TCP/IP" request to the server address identified by the link and receives a Web page in return. The browser executing on the client workstation interprets the HTML file that it has received and displays the Web page to the user of the client workstation.

The browser renders the Web page by interpreting HTML tags, which are embedded control information that indicates to a browser when certain action should be taken. For example, a tag may indicate to the browser: (1) that a graphics file should be retrieved and displayed at a particular location on the screen; (2) that the text following the HTML tag should be centered, bolded, or otherwise formatted; (3) that the background of the Web page should be shaded or have a particular pattern; or (4) that a different HTML file should be loaded and displayed in place of the HTML the file the browser in currently displaying.

The relative ease with which information may be collected, organized, and displayed to users throughout the world has made HTML files a popular way of disseminating information in a networked environment. For example, a broad range of companies now use internal collections of HTML files, which are commonly known as "Intranets." However, while HTML files excel at displaying and disseminating information to one or more groups of networked users, they do not allow a group of users to collaboratively share information in order to work on a common project. For example, although a collection of HTML files may allow separate users to publish information for consumption by one or more other members of a project team, such a collection of files does not does not facilitate a two-way exchange of information and project data between team members. For example, a team member viewing another team member's HTML file cannot add new comments or files to the file being viewed.

SUMMARY OF THE INVENTION

The present invention relates to methods and systems for providing a networked, collaborative work environment. In particular, the systems and methods described below allow a group of users to share work and files, engage in discussions related to a common project, and otherwise collaborate. For example, users interact with Web browsers executing on their client workstations to access Web pages that allow them to: participate in ongoing discussions; create new discussions about project topics; upload files to a common area associated with the Web page; download files and edit files that have been uploaded to the Web page by others members of the project team; and create new pages of various types and link them to existing ones. Thus, the disclosed systems and methods allow a set of geographically or corporately separate users to participate on a common project. In addition, the systems and methods of the present invention allow one or more of the users that are authorized to use the set of Web pages representing the common project to enable other users to access the Web page, that is, to allow those users to add new members to the team.

In one aspect, the present invention relates to a method for locally generating HTML pages for display which includes the steps of: receiving data associated with a project via a network; storing the received project data in a database; retrieving an HTML file from a memory element; and using the stored, received data in conjunction with the retrieved HTML file to render an HTML page for display to the user of a client workstation. In some embodiments, the databases are ODBC-compliant.

In another aspect, the invention relates to a system for allowing user to collaborate on a shared project using an HTML file server. A project database is stored on the HTML file server and contains information related to the shared project. Each client workstation locally stores a subset database which includes information related to the project which is relevant to that user's effort on the project. A plurality of HTML files is used in connection with the stored project information to render HTML pages for display to the user.

In still another aspect, the present invention relates to a method for providing a collaborative workspace which allows users to perform work on a shared project. A file request is received from a client workstation. An application capable of viewing the file is invoked. If the file was modified then it is transmitted to the server. In some embodiments, the modified file is transmitted using HTTP.

In still another aspect, the present invention relates to a method for transmitting files from a client workstation executing a network browser to a server which includes the steps of selecting a file to be transferred and dragging the selected file onto the browser application.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

Figure 1:
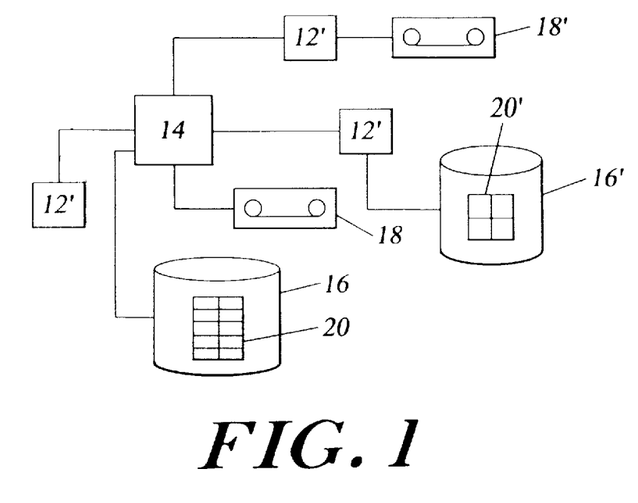
FIG. 1 is a block diagram of a system for providing a collaborative work environment.

Referring now to FIG. 1, and in brief overview, a system for providing a collaborative work environment via a network is shown. Client workstations 12' are connected to one or more servers 14. The client workstations 12' may be connected in any physical arrangement such as a star, loop, ring, or bus. The network connecting client workstations 12' and the server 14 may use any physical media, including wireless, provided that the physical media supports the HyperText Transfer Protocol (HTTP).

Figure 2:
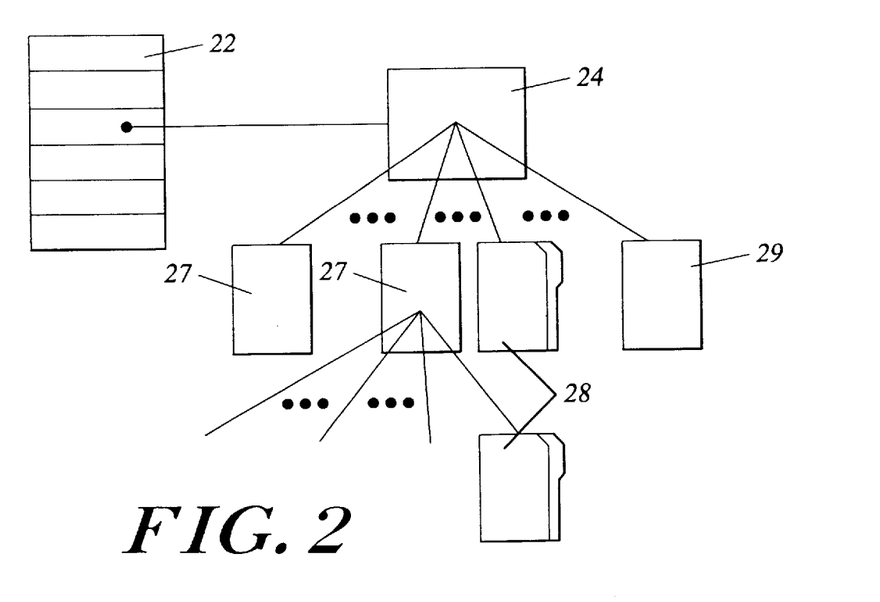
FIG. 2 is a diagrammatic view of a facility as stored by a server database.

The server 14 stores information relating to a project or a set of projects, referred to as a facility, in a database 20 which may be a flat database, relational database, multi-dimensional database, or object-oriented database. Each server 14 may store more than one database 20, where each database 20 represents a different facility. For example, one server may host project facilities for separate research efforts within one organization or for separate research efforts by separate organizations. Each facility is viewed by a user as a directory of eRoom pages. Referring now to FIG. 2, a directory of eRooms 22 as stored in the server database 20 is shown. Each entry provides at least one link to an eRoom front page 24, which in turn may contain other eRoom pages 27, folders containing database objects 28 or files 29.

Databases 20 may be stored by the server 14 on any convenient mass storage device. For example, FIG. 1 depicts an embodiment in which the server 14 stores the database 20 on an associated hard disk drive 16. Alternatively, the server 14 may store the database in Random Access Memory (RAM) if the database 20 is capable of fitting within the physical memory space of the server 14. The server 14 responds to requests for portions of the database 20 made by the client workstations 12' and transfers the requested data objects over the network to the requesting client workstation 12'.

The server database 20 stores various tables which contain information about eRooms, members, access controls, and other data objects. For example, a members table may be provided which includes unique identification codes for each user, a table value indicating for which eRooms the user fulfills a coordinator role, a table value which indicates for which eRooms the member fulfills an observer role, and a value describing the last time the member record was modified. Similarly, an eRooms table may be provided which includes a globally unique handle identifying the eRoom and one or more room flags which indicate various room attributes, such as whether a coordinator can create an eRoom, or whether the eRoom is a temporary, or trial, eRoom. Objects may also be represented by a table which includes as fields identification codes for each data object, one or more flags which are used to distinguish various objects, one or more flags which are used to determine the behavior of objects (editability, searchability, and others), a field indicating the date the object was created, a field indicating who created the object, a field identifying the parent of the object, and a field identifying the date the object was last modified, among others.

Figure 3:
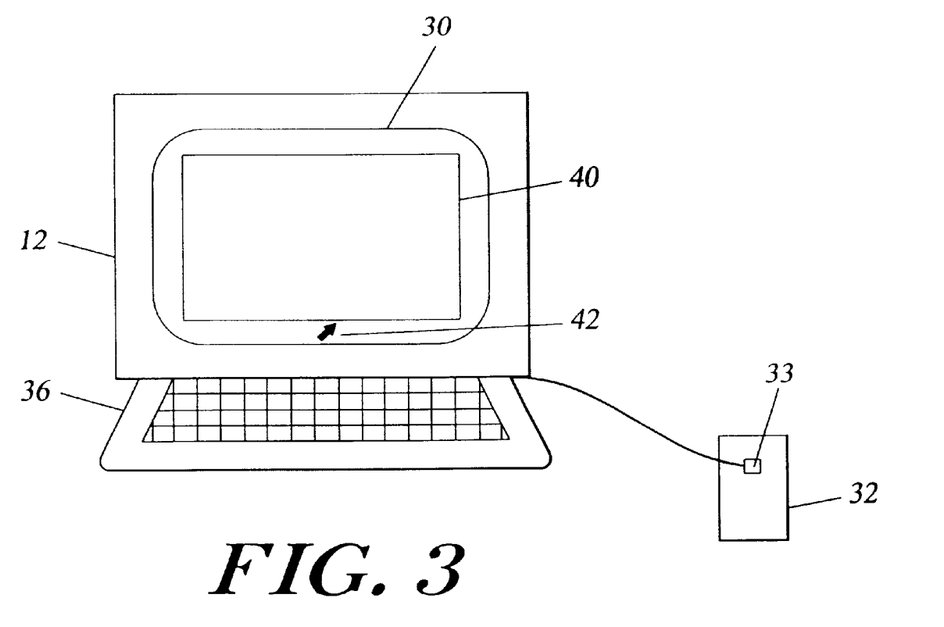
FIG. 3 is a diagrammatic view of a client workstation that may be used in the system of FIG. 1.

Referring also to FIG. 3, The client workstation 12' may be any machine that supports reception and transmission of data signals over an HTTP network. In general, a client workstation 12' is a personal computer executing a "browser" program to display an HTML page 40, on the screen 30 of the client workstation 12'. The user interacts with pages displayed by the browser utilizing a "point-and-click" interface, i.e., the viewing user uses a mouse 32 to manipulate a cursor 42 that is also displayed on the screen 30 of the client workstation 12'. Once the cursor 42 is over a particular portion of the HTML page 40, the viewing user signals by "clicking" or "double clicking" a button 33 on the mouse 32. Alternatively, the viewing user may also signal by pressing a key on an associated keyboard 36, such as the "return" key. In other embodiments, the viewing user may not use a mouse 32 at all, but may instead use a touchpad, a trackball, a pressure-sensitive tablet and pen, or any other input mechanism for manipulating the cursor.

The client workstation 12' uses a local database 20' to store data objects related to a project, while external files related to a project (such as a word processing document of a set of meeting minutes) are stored in the client workstation's 12' local file system. The client database 20' may be provided as a flat file database, relational database, multi-dimensional database, or object-oriented database. For example, a typical relational database that may be used to provide a client database 20' is Jet Database Engine, manufactured by Microsoft Corporation of Redmond, Washington. The database 20' stored on the client workstation 12' contains a relevant subset of the data objects stored by the server 14. That is, the database 20 stored by the server 14 typically will contain more information about a particular project than the database 20' stored by the client workstation 12'.

However, the database 20' stored on the client workstation 12' may contain tables which are not stored by the server database 20. For example, a client workstation 12 may store in its database an "unread" table which indicates which objects have been modified since the user of the client workstation 12' has last accessed those objects. An unread table may include a member identification field and a modification tag indicating the last modification date and time of an object. All records may be read from this table to identify to the client workstation 12' every item in a particular eRoom page which has not been read by the user, or a selective database query may be done to return only those objects belonging to a particular set of eRoom pages that have not been read by the user. If it is desired to provide this functionality, an additional entry in the unread table must be made to allow data objects to be distinguished based on some indication of affiliation.

Certain important information, such as hierarchy and navigation information, related to the project database 20 is considered "skeleton" information. Skeleton information is a set of database records that contain basic properties needed to display Web pages representing the project and therefore client workstations 12' require frequent updates of this information. Accordingly, it is generally desirable to exclude large information from skeleton information associated with a project, such as notes relating to an ongoing discussion, to facilitate transmission of the skeleton information to client workstations 12'.

The client workstation 12' uses project data received from the server 14 in combination with one or more template files to create and display to the user of the client workstation a private, secure collection of HTML pages that provide a virtual workroom for members of a team, whatever its size and wherever the members of the team are physically or corporately located, may be referred to throughout as an "eRoom", or an "eRoom page". An eRoom is a set of connected HTML pages displayed to a user that displays project-related files, data, and discussion lists. Members of a team may congregate, share work and files, discuss ideas, stay informed and otherwise collaborate on common projects using an eRoom.

Client workstations 12' generally have local memory elements for storing data objects of files associated with a project that are downloaded from the server 14 as well as one or more eRoom templates. A client workstation 12' may have an associated mass storage device such as a hard disk drive 16' or a tape drive 18' for storing the set of eRoom templates, although if a client workstation 12' is provided with enough RAM to store the set of eRoom templates, then the mass storage devices need not be provided.

Figure 4:
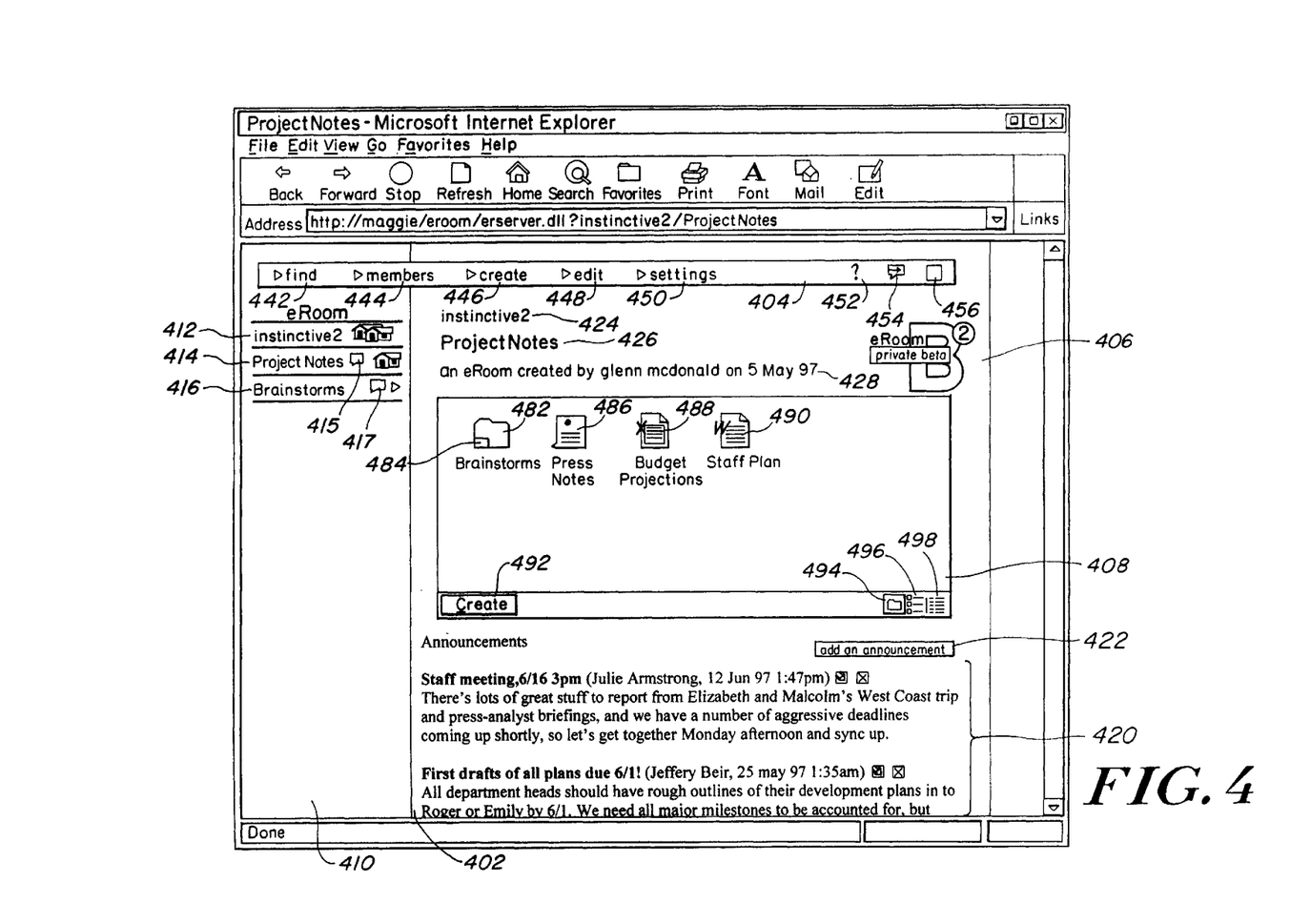
FIG. 4 is a screen shot of an HTML page viewed by a user of the system of FIG. 1.

FIG. 4 depicts an embodiment of an eRoom page 60 that a user might encounter while using a popular "browser" program, Internet Explorer, manufactured by Microsoft Corporation of Redmond, Washington. The eRoom page has five major elements: a page element 402; a navigation bar 404; a graphical identifier 406; an item box 408; and a shortcut list 410.

The page element 402 may include subelements. In the embodiment depicted in FIG. 4, a discussion 420 is embedded within the page and there is a facility 422 to allow a viewer to contribute to the discussion 420. The embedded discussion 420 and the contribution facility 422 may be implemented as ActiveX controls, a JAVA applet, or various other means. Further, the facility name is displayed 424, as is the name of the viewed page 426 and a description of the viewed page 428.

The navigation bar 404 provides a number of controls for the viewer of the page. For example, in the page embodiment shown in FIG. 4, the navigation bar 404 provides eight commands; "find," 442 which performs a find for a specified object; "members," 444 which permits certain users to change the membership list and access levels associated with members; "create," 446 which allows certain users to create new items and pages; "edit," 448 which allows certain users to edit eRoom pages; "settings," 450 which permits settings for the display and management of eRooms to be changed; a question mark icon 452 which invokes a help system; a "next unread" icon 454 which displays to the viewer an unread item or file; and an up-arrow icon 456 which displays the "parent" of the eRoom currently being viewed, that is, it displays an eRoom page one logical level "up" from the currently viewed eRoom page.

The graphical element 406 is used to pictorially identify the viewed page. The graphical element 406 may be a corporate logo or other organizational identifier. The graphical element 406 may be static (as depicted in FIG. 4) or it may be a dynamic identifier such as a JAVA script or ActiveX control.

The item box 408 collects and displays items associated with the project represented by the page 402. In the embodiment shown in FIG. 4, the item box 408 contains a folder of items 482, a notes file 486, a spreadsheet file 488, and a word processing file 490, each of these being links to other eRoom pages or files. Other items which may be displayed in an item box 408 are version organizers, discussion, links, and vote/poll pages which survey team membership on one or more issues. The item box may also include a facility for creating new items 492. The item box 408 may also include icons which control how items are displayed in the item box 408. In the embodiment shown in FIG. 4, three icons are provided: an "icon display" icon 494 (currently selected) which causes items to be displayed as large icons with identifying text underneath; a "list display" icon 496 which causes items to be displayed as small icons with identifying text to one side of the icon; and a "report display" icon which causes items to be displayed as a list. The displayed list may be alphabetized, ordered by size of item, ordered by creation date, ordered by modification data, or ordered by some other data field associated with each item.

Items in the item box may include a graphical indication that it, or items contained within it, are unread. This may imply that the item has been newly created, or the item may have been modified since the viewing user last read it. In either event, the graphical indication signals the user that the item should be read. In FIG. 4, the "Brainstorms" folder 482 has an indication 484 that it is unread.

eRoom pages also may include a shortcut bar 410. The shortcut bar is a list of shortcuts which provide the viewer with a convenient way to access other eRoom pages. For example, in the embodiment shown in FIG. 4, a shortcut to the directory of eRooms is provided, as well as shortcuts to the page currently viewed 414 and a shortcut 416 the folder 482 displayed in the item box 408. The folder shortcut 416 includes a graphical indication that there are unread items in the folder 417. The shortcut to the front page of the eRoom currently being viewed 414 also includes a graphical indication that unread items exists in the page 415. Shortcuts may be added to the shortcut bar by the viewing user. In order to read the unread items in the folder 482, the viewing user may use the shortcut 416 to access the contents of the "Brainstorms" folder 482 and determine which items are unread or the user may simply click on the "next unread" icon 454. The shortcut bar 410 may be provided as an ActiveX control or as a JAVA applet or other means.

As noted above, users interact with eRooms by using Web browsers in a traditional manner. That is, users may traverse a hyperlink to access an eRoom, or users may directly enter a URL address into the browser. Regardless of the manner in which the URL address is accessed, the browser retrieves the HTML file in order to display it. However, if the URL address is an eRoom, the server of the file returns a file of control information, referred to as a "wrapper" file. The wrapper file is an HTML file which contains, among other information, an identification of the object to be displayed. The wrapper file delivers an object ID which is used by the client workstation 12' to look up the object in the local database 20 stored on the client workstation 12'. The local database 20 includes information about the object, including which eRoom template to use and information regarding any "children" the object may have (for example, items contained in the item box).

Generation, display, and management of eRooms is controlled by a "page builder" application residing on the client workstation 12'. The page builder application may be provided as specialized hardware or software operating on a general-purpose machine. In some embodiments, the page builder application may be provided as an Active X control or a COM object.

Figure 5:
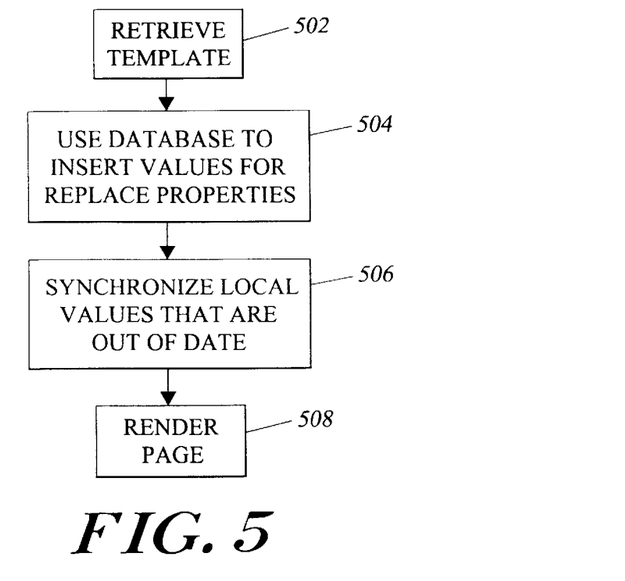
FIG. 5 is a flowchart of the steps taken by a client workstation to render an HTML page of the sort depicted in FIG. 4.

Referring to FIG. 5, the first step that is taken by the page builder application is to retrieve the eRoom template indicated by the wrapper file (step 502). An eRoom template is an HTML file having additional eRoom-specific information embedded in it. The eRoom specific information is generally distinguished from HTML tags. For example, eRoom-specific information in an eRoom template may be surrounded by "<<" and ">>". Any symbol or set of symbols may be used to distinguish eRoom-specific information so long as eRoom-specific information is distinguishable from HTML tags.

eRoom information in a template includes sections controlling the page itself, the controls on it, and the way the page's data is presented the page is created or edited.

The Template section controls several miscellaneous items about the template itself, for example, the Template Section may include name information, information specifying which thumbnail appears when the page template is selected, a description of the identifying text that appears under the thumbnail, how children (i.e. dependent pages) of this type of page are counted, and whether the page should open automatically when created. In one embodiment, the Template section of a Folder may be configured in the following manner:

```
Begin_Template
{
    category = container
    wizardname = "Folder"
    thumbnail = folder
    Icon = 0
    DYNAMIC
    {
        Suffix = "item"
        SuffixP1 = "items"
        OpenOnCreate = "no"
        Blurb = "A container for storing and organizing
            files, links and other pages."
    }
}
```

The template section above specifies the folder template's name ("Folder"), thumbnail, default icon, and identifying text (blurb). "OpenOnCreate" specifies that folders are not automatically opened when created, and "Suffix" and "SuffixP1" control the text that appears with the child count in the size column when a folder appears in an item box. DYNAMIC sections allow the template creator to add properties to a page that are not standard template properties. For example, in the example above, Suffix, SuffixP1, OpenOnCreate, and Blurb have been added to this template by the template creator. The following is an exemplary list of various template properties that may be used in embodiments of their invention:

Template Properties

Category: specifies which set of icons is presented when a "Change Icon" command is attempted on items with this template. Valid choices are "container" (for folders and version organizers), "content" (for note pages) and "discussion" (for discussions). Discussion notes do have a category ("note"), but actually they never appear with icons.

Wizardname: specifies the name of the template when it appears as a choice in the page wizard. "Folder" and "Note" are examples of these.

Thumbnail: which thumbnail to display when this template is selected in the page creation facility. Thumbnails may be .bmp files stored in a predefined subdirectory which refers to them by name without the .bmp extension.

Icon: the index number (within the icon set specified by "Category") of the default icon for items with this template.

Suffix: the string to use after the child count in the size column when items with this template appear in the item box, e.g., "item" for folders, "note" for discussion, "version" for version organizers. This property must be placed within the braces of a "DYNAMIC{ }" subsection within the Template Section.

SuffixP1: the plural version of the Suffix. e.g., "items", "notes", "versions".

OpenOnCreate: whether or not to open new items of this type automatically when created. "No" for folders, generally "Yes" for everything else.

Blurb: the identifying text that appears under the thumbnail when this template is selected in the page wizard.

The Control section(s) appear for each eRoom discussion or item box on the page, setting various properties like the column headers of an item box, or the sort-direction of a discussion. In one embodiment, the Control section for the item box in a Folder may be configured in the following manner:

```
Begin_Control
{
    controlname = ERPage
    wizardname = "contents"
    childtype = "container,discussion,content,external,link"
    defaulttarget = yes
    DYNAMIC
    {
        InitialView = "Report"
        ShowCreation = FALSE
        ShowModifyTme = True
        ModifyWidth = 116
        SizeWidth = 68
        Width = 443
    }
}
```

The "DYNAMIC" section for the example above specifies that the item box in a Folder starts displaying items in Report display, does not show a column for creation date, does show the time along with the date in the Modified column, and has modified column widths. The following is an exemplary list of various control properties that may be used in embodiments of the invention.

Control Properties controlname: the section to which the control applies.

childtype: which categories of templates may be created of this page.

defaulttarget: set if the template has an item box into which items dropped on the icon for this page should go.

excludechildcount: set on item boxes or discussion whose children or notes should not count as part of the page's size, like the Attachments box on a Note page, and the embedded discussion areas on folders and version organizers.

substorage: set if creating one of these should also create its first child. Used for discussion, so that the page wizard for creating a discussion also prompts the user to title and enter the first note.

InitialView: specifies the initial display mode of items on this page (Report, Small icon, Large icon). This property must be placed within the braces of a DYNAMIC { } subsection within the control template.

SwitchViews: allows the page to hide from a user the ability to switch modes. This property must be placed within the braces of a DYNAMIC { } subsection within the control template.

CreateLabel: overrides "Create" as the creation button label. This property must be placed within the braces of a DYNAMIC { } subsection within the control template.

TitleWidth: specifies the title column width. Otherwise, the title column will size itself dynamically to fill the space left by the other columns. This property must be placed within the braces of a DYNAMIC { } subsection within the control template.

CreateWidth, ModifyWidth, OwnerWidth, SizeWidth: used to specify alternate column widths. This property must be placed within the braces of a DYNAMIC { } subsection within the control template.

TitleName, CreateName, ModifyName, OwnerName, SizeName: used to override "Name", "Created", "Modified", "Owner" and "Size" as the column names. This property must be placed within the braces of a DYNAMIC { } subsection within the control template.

ShowSize, ShowOwner, ShowModification, ShowCreation: allowing display or concealment of these columns. This property must be placed within the braces of a DYNAMIC { } subsection within the control template.

ShowCreateTime, ShowModifyTime: set to show time, along with date, in these columns. This property must be placed within the braces of a DYNAMIC { } subsection within the control template.

ShowSizeSuffix: allows the size column just show a raw number, not "x notes", "x items", etc. This property must be placed within the braces of a DYNAMIC { } subsection within the control template.

SortColumn: set this to "Create", "Modify", "Owner", or "Size" to specify a column other than the name as the initial sort key.

SortAscending: specifies reverse or normal sort.

ShowHeader: set this to "False" to hide the column headers.

Width: set this to the width of the item box. This property is used to make sure the icons for newly created items are given the correct XY coordinates for Large Icon mode.

AnnotationTarget: set this to the name of an item box in the current template to make the Edit New Version command appear for items in this item box. The new copies will be sent to the item box specified.

The Wizard section: this section defines the functions used for creating and editing the page. Each widget in the wizard is listed here, with properties controlling what sort of widget it is (checkbox, plain text or rich text), the text of the prompt that appears before it, and the default value. The Wizard section in a Folder looks like this:

```
Begin_Wizard
{
    Name
    {
        widgettype = text
        prompt = "Name"
        default = ""
```

```
        indent = 32
        DYNAMIC
        {
            longdescription = "Choose a name for this
            folder, and add a description of you want
            one."
        }
    }
    Use Description
    {
        widgettype = checkbox
        prompt = "Show description"
        default = TRUE
    }
    Description
    {
        widgettype = rich_text
        prompt = ""
        default = ""
        indent = 0
        DYNAMIC
        {
            richtextheight = 153
        }
    }
    UseComments
    {
        widgettype = checkbox
        prompt = "&Include space for comments"
        default = TRUE
    }
}
```

The widget section described above specifies four editable widgets in the wizard: a text box for the title, checkboxes for whether or not to use the description and the embedded discussion, and a rich-text box for the optional description. The following is a list of wizard properties that may be used in various embodiments of the invention.

Wizard Properties

Widgettype: which edit widget to use for the property. Can be "text", rich-text" or "checkbox".

Prompt: the text to show before the widget.

Default: the default value for the property

Indent: how much to indent the widget to the right of the prompt. An indent of 0 means to put the widget below the prompt, not the right of it.

Longdescription: This property must be placed within the braces of a DYNAMIC { } subsection within the control template, used on the first widget in the Wizard section, to provide an optional extra line of instructions to appear at the very top of the wizard page.

Richtextheight: used on rich-text widgets, to control their height. This property must be placed within the braces of a DYNAMIC { } subsection within the control template.

The header for many pages also includes an "INCLUDE" tag, which refers to additional header information for embedded discussions (see below), which is stored in a separate template for convenience.

Referring once again to FIG. 5, once the appropriate template has been retrieved from mass storage associated with the client workstation (step 502), the next step taken by the page builder application is to replace all of the Replace Properties contained in the template with project information from the project database (step 504). Following is a list of exemplary Replace Properties:

Replace Properties

Name, Description, UseDescription, UseComments: editable properties from the page wizard.

$ROOM: the name of the eRoom.

$CREATOR: the creator of the eRoom.

$CREATEDATE: the date and time the eRoom was created. Allowable formats are "short," which displays some abbreviated form of the date such as date-slash format or month-year format, and "long," which displays the full year including month year and day.

$ERDATADIR: the full path subdirectory in which eRoom data for the page is stored.

$DISCUSSIONBODY: the body of a discussion.

$DISCUSSIONINDEX: the list of note titles used for the sidebar index in discussions.

In order to fully render an eRoom the page builder application uses the portion of the project database which is stored locally on the client workstation 12', as well as any files which are stored locally, to "fill in" any replace properties contained in the template. For example, if the page builder application encounters a $DISCUSSIONBODY replace property, it accesses the local database 20 cells that contains the discussion indicated by the replace tag and includes the text of that discussion in the rendered eRoom page. The page builder application may be written as a procedural routine that examines an eRoom template for a particular set of replace properties; in this embodiment, the page builder application would need to be rewritten whenever a new replace property is defined.

Because multiple users may concurrently, and even simultaneously, perform work on a project, the page builder must ensure that the objects from the local database and locally stored files are not stale before inserting them into the eRoom template (step 506). Put another way, the client workstation's local project database 20' must be synchronized with the server's project database 20 to ensure data coherency. Synchronization may be done in at least four different ways: (1) periodically in the foreground; (2) event-triggered in the foreground; (3) periodically in the background; and (4) event-triggered in the background. If synchronization is done in the foreground, then the user is blocked from performing any work while the synchronization occurs. Background synchronization allows the user to continue working. For example, the object ID for an object is used to query the local database 20'. The object record may include a modification tag value (as described above), or each data object may be provided with one or more state bits which can be set to indicate the file or data is stale. If the modification tag value or state bits indicate that the object needs to be synchronized, the updated object may be requested from the server in the foreground or in the background. Alternatively, a client workstation 12' may periodically search its entire local database 20' for objects which need to be updated. This may take the form of a database query for objects having a modification tag value less than the current value, or a database query for objects having a particular value for state bit fields. Objects returned by the query are requested from the server as discussed above.

Synchronization is enabled by storing all records in the server database with an associated modification tag. The tag is a positive integer which is taken from an ever-increasing counter. The counter increments each time it is read, i.e., each time a new modification tag is assigned to a data object stored on the server 14. When a client workstation 12' synchronizes its local databases and files, it also receives the current modification tag, i.e., it also receives the current value of the counter. Alternatively, the current modification tag value can be included as extra information in each "wrapper page." The client workstation 12' includes the last modification tag value it received when it makes a subsequent synchronization request. The server 14 transmits to the client workstation 12' any data objects to which the user has appropriate access rights that also have a modification tag value greater than the modification tag value sent with the synchronization request. The client workstation 12 stores the received data objects in its local database and stores the new received modification tag value. Client workstations 12' and servers 14 may be separated by relatively slow, lossy channels such as telephone networks. Accordingly, synchronization requests can sometimes fail for various reasons, e.g., a connection node is out of service or a necessary transmission line suffers too many errors to allow a reliable connection to be made. In this event, the synchronization request fails and should be retried later.

Once synchronization has been accomplished and local database metadata has been updated, the appropriate data objects and values are inserted into the eRoom where indicated by Replace Properties, and the eRoom is displayed to the user (step 508) by the browser application in a traditional manner (refer to FIG. 4).

Files displayed by an eRoom may be viewed or edited by team members having the appropriate access controls (discussed in more detail below). A user indicates that a particular file should be retrieved from the server for editing or viewing by any one of a number of traditional methods, such as double-clicking, selecting the file and pressing the "Enter" key on the keyboard, or pressing the right-hand key on a mouse input device and selecting the appropriate action from the displayed pop-up menu. File download and subsequent upload, if necessary, is managed by a background daemon. Alternatively, file upload and download may be managed by a separately executing program; the only requirement is that the file upload/download application executes separately from the browser application, so that premature exiting of the browser program is handled appropriately by upload/download code.

Figure 6:
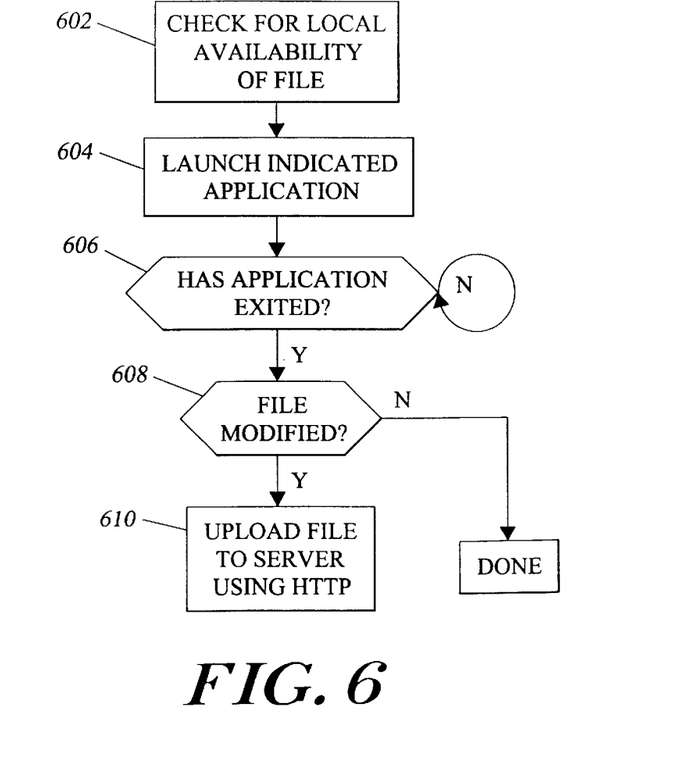
FIG. 6 is a flowchart of the steps taken by a client workstation to allow users of the system to edit files.

Referring now to FIG. 6, the first step taken by the background daemon is that the local file directory is checked to determine if the selected file is already resident in local mass storage associated with the client workstation 12' (step 602). If the file is not present or is stale, then it must be downloaded from the server 14. The file is checked to determine whether another client workstation 12 has caused an edit lock to be set on the file indicating that the file is being edited. This may take the form of a database query for the object ID associated with the file which returns at least the metadata associated with the file indicating presence or absence of an edit lock. If no edit lock has been set for a requested file, the access rights of the requesting user are checked. If the user has appropriate access rights, i.e., "can edit" if the user has indicated editing will occur or "can view" if the user has indicated only viewing will occur, the user will be allowed to retrieve the file. In the case of a user that indicated editing will occur, an edit lock is set before the file is downloaded. This ensures that no other user will be able to download the file for editing purposes while the edit lock is set. The requesting user is blocked from further work until the file download is complete. File transfers are accomplished using HTTP and this process is described in more detail below.

Once the file has been downloaded, or if the file was already present in local mass storage, the Watcher launches the application used to edit the file (step 604). The indicated application may be determined using the Object Linking and Embedding standard (OLE), the file suffix (three characters in a DOS-based system), or the server 14 may store file metadata which is transmitted together with the file and indicates which application should be used to open and edit the file. If the server 14 stores file metadata, a list of alternate applications may be stored, either on the server 14 or the client workstation 12, so that if a client workstation does not have access to a first application, other applications are specified which may be used.

The background daemon waits for the indicated application to exit, or the document to close, before taking further action (step 606). Once the application has exited, the background daemon determines if the file has been modified (step 508). If not, the background daemon does not need to take further action, except for freeing the edit lock if one was set. However, if the file was modified, then it must be uploaded to the server 14 using HTTP (step 610). The file upload may be done in the background or in the foreground. If done in the foreground the user will be blocked from further work on that file until the upload is complete. Once the upload is complete, the server 14 updates metadata stored in its database 20 that is associated with the file, for example, any edit lock set by the editing user is released.

As noted above, users may perform work on files and objects locally and upload the modified files and objects to the server 14 for viewing, comment, or further modification by other project team members. The systems and method of the present invention allow users to upload newly created and modified files to a server 14 using an intuitive drag-and-drop method.

Figure 7:
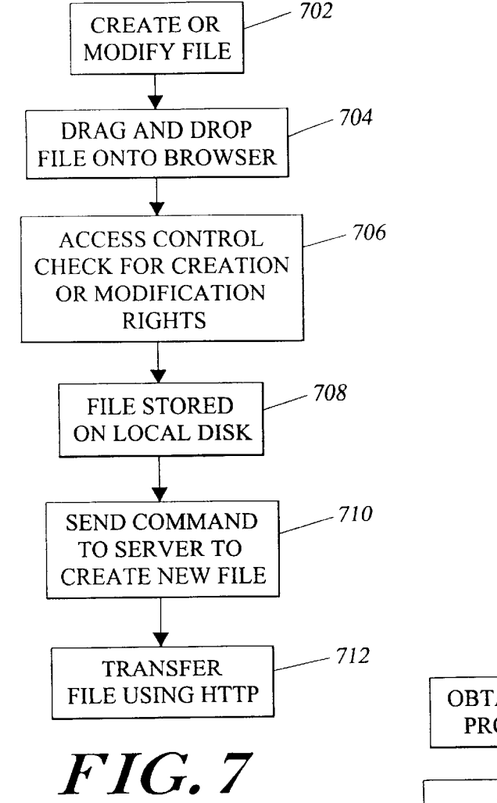
FIG. 7 is a flowchart of the steps taken by the client workstation to allow users of the system to upload files to a server using a "drag-and-drop" interface.

Referring now to FIG. 7, a user creates a new file or modifies a file downloaded from the server 14 (step 702). It should be understood that this step includes actions such as creating a new version of the file locally so that other users may still check out the "original" copy of the file present on the server 14. Once the user is finished editing the file, it may be uploaded to the server 14 to allow other users access to it. The user signals that the file should be transmitted to the server 14 by dragging the file onto an eRoom displayed by the browser (step 704). Dropping the file into the displayed eRoom invokes an ActiveX control or a background daemon process which manages the upload of the file to the server 14.

The user's access rights are checked to ensure that the user possesses "create" or "modification" rights for the page to which the user desires to upload the file (step 706) and the file to be uploaded is stored to local mass storage (step 708). Access rights may be checked over the network in many ways. For example, each object may be provided with a field or fields which identify users that may open, view, and edit the object. Alternatively, an object may assign a pre-defined value to a field which controls access to the object. For example, a "coordinator" role may be defined and an object may identify that any coordinator may edit, open or view it.

If the user has the appropriate rights, then a command is sent to the server to create a new file (step 710). This step may be skipped if the user is modifying a file instead of creating a new file. However, creation of a new file allows the server to provide a degree of fault tolerance and version control, if those features are desired. If the server has been instructed to create a new file, a new object is created containing metadata associated with the data file and the file is transmitted to the server 14 using HTTP (step 712). If a file modification is occurring, the server 14 updates the metadata contained by the data object associated with the file and the file is transmitted to the server 14 using HTTP (step 712). The server 14 associates the uploaded file with the newly-created data object.

File metadata may include: the name of the file; the size of the file; the date the file was created; the date the file was last modified; access information such as which users may open, view, and edit the file; and information regarding the edit status of the file, such as whether an edit lock has been set by a user.

HTTP Transfer Protocol

Throughout the specification, whenever reference is made to transmitting data to or from a client workstation 12', the transfer is accomplished using HTTP. While this is the traditional way to transmit HTML files from severs to clients, it is not used to transmit HTML files from clients to servers. The systems and methods described herein use HTTP to transmit large files of data, such as word processing files, spreadsheets, etc. The advantage of using HTTP to transmit all project data is that users from different organizations can easily and transparently share data since data transmitted by HTTP will be more compatible with firewalls or other security mechanisms established by their respective organizations.

Figure 8:
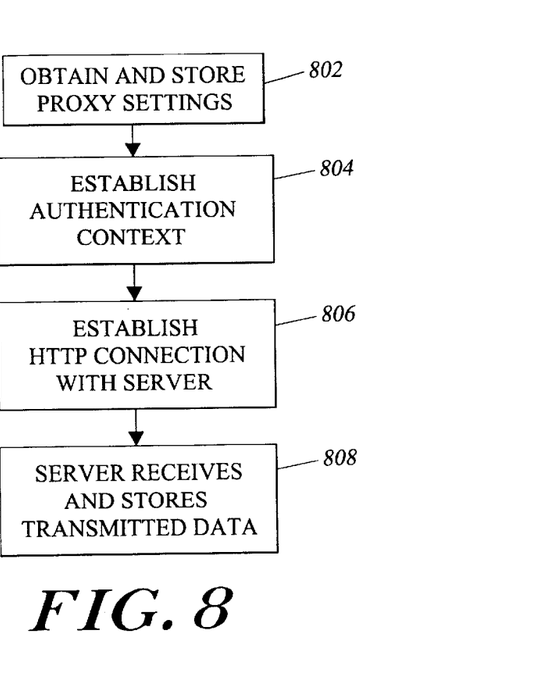
FIG. 8 is a flowchart of the steps taken by the system to transfer a file using HTTP.

Referring now to FIG. 8, the first step in transmitting data using HTTP is that the client workstation 12' obtains any proxy server settings in use by the browser application executing on the client and stores those proxy settings for later use (step 802). The client workstation establishes an authentication context by connecting to a server using a series of HTTP commands (step 804). This is much like the process used for logging into a server 14 hosting eRooms, and is described in greater detail below. An authentication context may be any method for establishing the identity of a remote user; a common context is a username-password pair.

The client workstation 12' establishes an HTTP connection to the server 14 (step 806) using the proxy settings stored in step 802 and sends an HTTP POST request to the server 14. The HTTP POST request includes: a URL identifying a directory located on the server 14 where the data should be stored; an identification code uniquely identifying the data; a header containing information about the data such as authorization information; and the data itself Once the eRoom server 14 has verified the uploading user's authentication context, e.g., username and password pair, it receives the data and stores it based on the document identification code transmitted in the HTTP POST command (step 808).

Access Control

As noted above, the eRoom skeleton is the set of database records that contain the basic properties needed to display an eRoom. The concept of skeleton information provides a first level of access control, because only data objects stored in "containers" for which a particular user has Open privileges are synchronized to that client's workstation 12'.

Since every file and eRoom item is represented as an object in the database, access of users to each item can be controlled by entries in the database schema. For example, every eRoom may be represented by a table which has, as one or more of its fields, a list of the members that are entitled to enter the eRoom. In some embodiments, users may be divided into three separate groups: coordinator; reader; and participant. In this embodiment, a coordinator can add members to the eRoom and may supersede any rights granted to users. A reader is someone who has access to the eRoom solely to view the content of that eRoom while a participant is a user that may access the eRoom and may edit the objects and files contained in the eRoom as well as upload new objects and files to the eRoom. User access may be checked by running the database query on the appropriate table and only allow a user to access the eRoom when that user's name or authentication context appear as an entry in the table, i.e., is returned from the database query as a result.

Some embodiments, include a "persist layer" which provides persistent storage to a relational database. The persist layer provides an application program interface which allows application programs to issue individual commands to relational databases, each command providing a flexible number of input parameters and output return values. Each persist command may be mapped to a database query statement that is used when the command is executed. This mapping is encapsulated, i.e., hidden from clients of the persist layer. Encapsulation of the persist commands allows them to be redirected to different databases or optimized without requiring the client application program to be modified.

In another embodiment, the persist layer described above is based on the ODBC protocol. ODBC allows an application program to "prepare" a data query and then execute the prepare statement multiple times. Execution of prepared statements offers significant performance improvements. The "persist layer" may further monitor which statements are executed most often. Based on statement execution counts, statements may be dynamically prepared based on their usage. In some embodiments, a statement may be prepared for a limited period of time, after which it is "unprepared." Alternatively, a statement may be prepared after a certain number of uses and then be unprepared if it is not used within a certain period of time.

While the invention has been particularly shown and described with reference to specific preferred embodiments, it should be understood by those skilled in the art that various changes in form and detail may be made without departing from the spirit and scope of the invention as defined by the appended claims.

What is claimed is:

1. A method for transmitting files from a client workstation to a server, the client workstation executing a Web browser, the method comprising:
   (a) identifying a request to transmit a file from the client workstation to the server based on the file being dragged onto the Web browser executing on the client workstation; and
   (b) in response to the file being dragged onto the Web browser,
      (i) storing the file to local persistent memory;
      (ii) instructing the server to incorporate the file in a server database on the server; and
      (iii) transmitting the file from the local persistent memory to the server using a HyperText Transfer Protocol (HTTP).

2. The method of claim 1 further comprising updating data associated with the file.

3. The method of claim 1 further comprising verifying that the client workstation has access control rights to incorporate the file in the server database.

4. The method of claim 1 further comprising:
   retrieving the file from the local persistent memory; and
   displaying the file on the client workstation.

5. The method of claim 1 further comprising downloading the file from the server if the file is at least one of stale and missing from the client workstation.

6. The method of claim 1 further comprising invoking at least one of a software control or a background daemon process to manage the transmitting of the file to the server.

7. The method of claim 1 further comprising enabling the file to be at least one of viewed and edited.

8. The method of claim 1 further comprising verifying that the client workstation has access control rights to edit the file.

9. The method of claim 8 wherein verifying that the client workstation has access control rights to edit the file further comprises determining if an edit lock is set on the file indicating that the file is being edited.

10. The method of claim 1 further comprising determining if the file has an associated field identifying whether the client workstation has access control rights to access the file.

11. The method of claim 1 wherein transmitting the file from the local persistent memory to the server further comprises:
   obtaining at least one proxy server setting for the transmission to the server;
   establishing an authentication context with the server by enabling identification of a user; and
   using the at least one proxy server setting to transmit a request to the server associated with the file.

12. The method of claim 11 wherein transmitting the file from the local persistent memory to the server further comprises:
   transmitting a uniform resource locator (URL) to the server identifying a directory located on the server to store the file;
   transmitting an identification code identifying the file to the server;
   transmitting a header comprising information about the file to the server; and
   transmitting the file from the local persistent memory to the server using HTTP.

13. A method for transmitting files from a client workstation to a server, the client workstation executing a Web browser, the method comprising:
   (a) identifying a request to transmit a file from the client workstation to the server based on the file being dragged onto the Web browser executing on the client workstation; and
   (b) in response to the file being dragged onto the Web browser,
      (i) verifying that the client workstation has access control rights associated with the file; and
      (ii) transmitting the file to the server.

14. The method of claim 11 wherein transmitting the file from the local persistent memory to the server further comprises storing the at least one proxy server setting in the local persistent memory.

15. The method of claim 13 further comprising displaying a Web page using the Web browser executing on the client workstation, the Web page representing a collaborative workspace, the file being dragged onto the Web page displayed by the Web browser.

16. The method of claim 13 further comprising:
   retrieving the file from a local persistent memory; and
   displaying the file on the client workstation.

17. The method of claim 13 further comprising downloading the file from the server if the file is at least one of stale and missing from the client workstation.

18. The method of claim 13 further comprising storing the file to local persistent memory.

19. The method of claim 13 further comprising enabling the file to be at least one of viewed and edited.

20. The method of claim 13 further comprising updating data associated with the file.

21. The method of claim 13 wherein verifying that the client workstation has access control rights associated with the file further comprises verifying that the client workstation has access control rights to incorporate the file in a server database on the server.

22. The method of claim 13 wherein verifying that the client workstation has access control rights associated with the file further comprises verifying that the client workstation has access control rights to edit the file.

23. The method of claim 22 wherein verifying that the client workstation has access control rights to edit the file further comprises determining if an edit lock is set on the file indicating that the file is being edited.

24. The method of claim 13 further comprising determining if the file has an associated field identifying whether the client workstation has access control rights to access the file.

25. The method of claim 13 wherein transmitting the file to the server further comprises:
   obtaining at least one proxy server setting for the transmission to the server;
   establishing an authentication context with the server by enabling identification of a user; and
   using the at least one proxy server setting to transmit a request to the server associated with the file.

26. The method of claim 25 wherein transmitting the file to the server further comprises:
   transmitting a uniform resource locator (URL) to the server identifying a directory located on the server to store the file;
   transmitting an identification code identifying the file to the server;
   transmitting a header comprising information about the file to the server; and
   transmitting the file from a local persistent memory to the server using HTTP.

27. The method of claim 25 wherein transmitting the file to the server further comprises storing the at least one proxy server setting in a local persistent memory.

* * * * *